Sept. 27, 1938.    R. SOYER    2,131,528
FLYING MACHINE ADAPTED TO LAND ON WATER
Filed July 28, 1937    5 Sheets-Sheet 1

INVENTOR
Robert Soyer,
By Watson, Coit, Morse
& Grindle ATTYS.

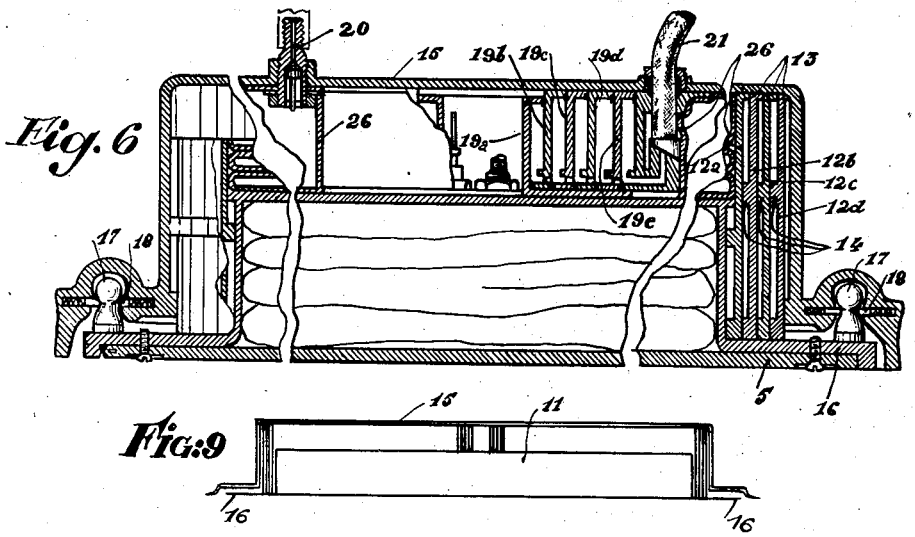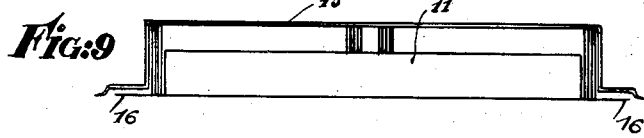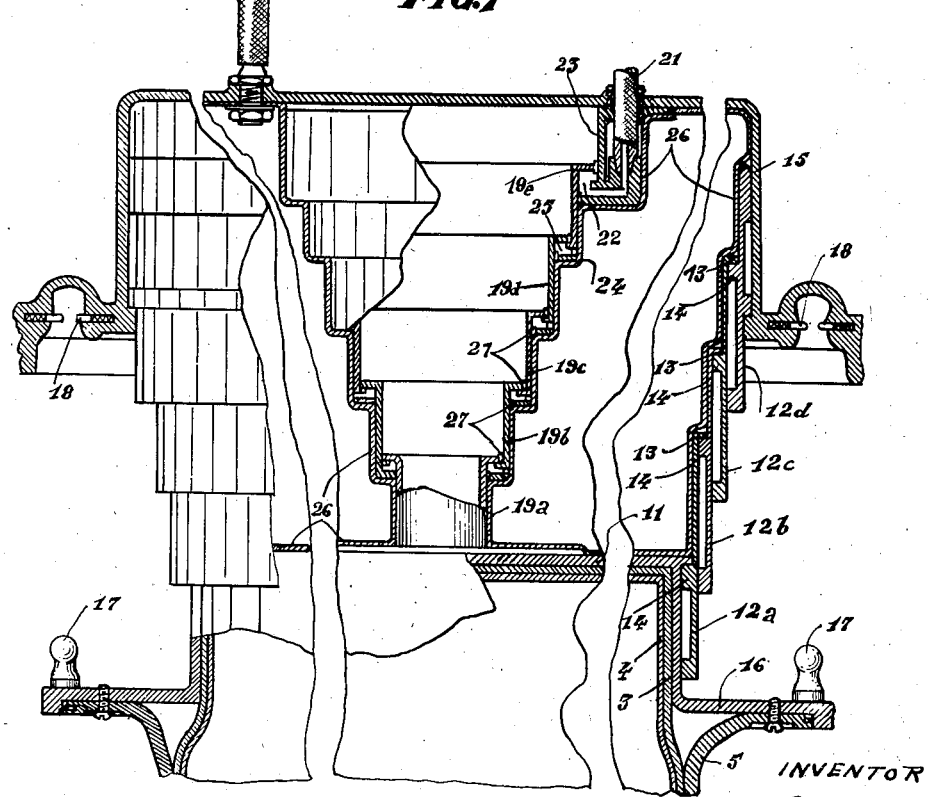

Sept. 27, 1938.  R. SOYER  2,131,528
FLYING MACHINE ADAPTED TO LAND ON WATER
Filed July 28, 1937  5 Sheets-Sheet 3
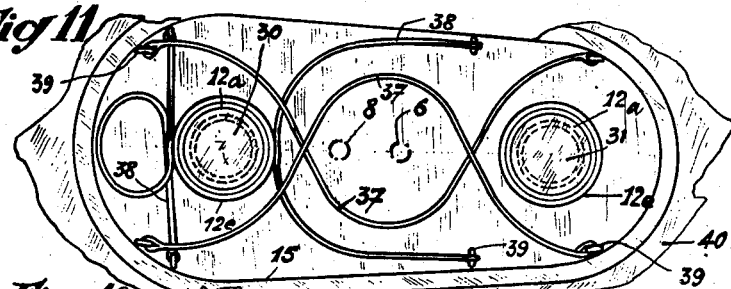
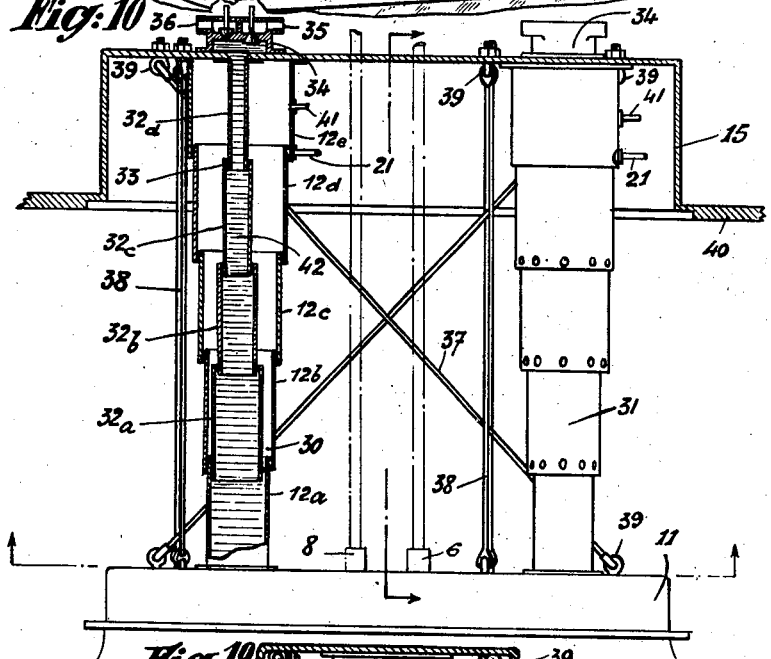
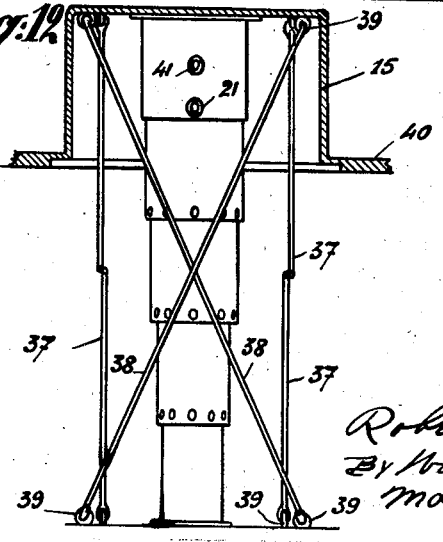
INVENTOR
Robert Soyer,
By Watson, Coit,
Morse & Grindle
ATTYS.

Sept. 27, 1938.   R. SOYER   2,131,528
FLYING MACHINE ADAPTED TO LAND ON WATER
Filed July 28, 1937   5 Sheets-Sheet 4
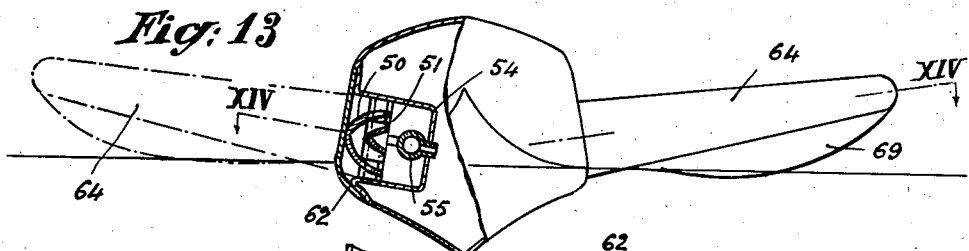
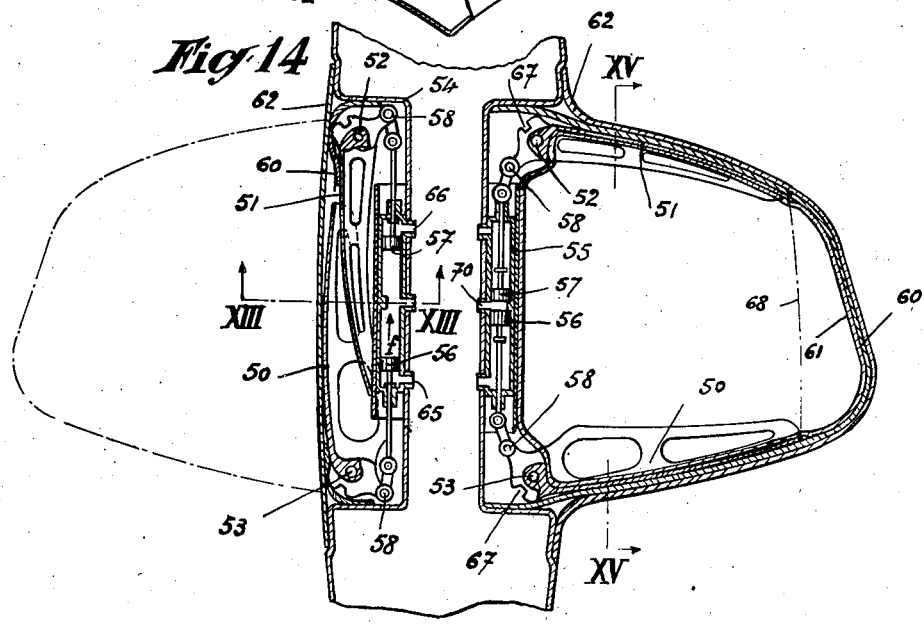
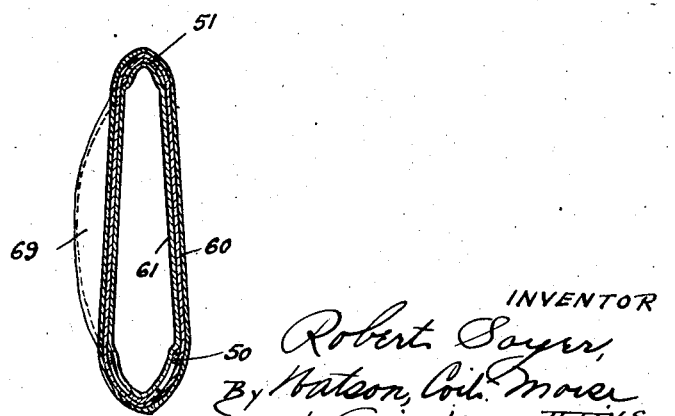

Sept. 27, 1938.   R. SOYER   2,131,528
FLYING MACHINE ADAPTED TO LAND ON WATER
Filed July 28, 1937   5 Sheets-Sheet 5
Fig:16
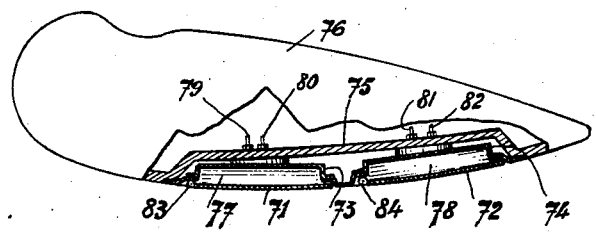
Fig:17
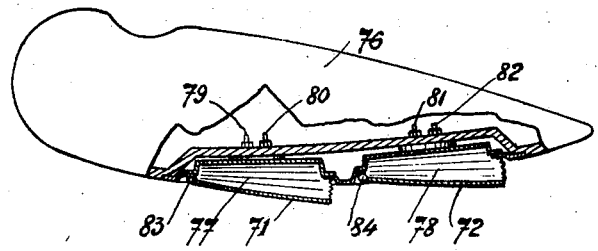

Patented Sept. 27, 1938

2,131,528

UNITED STATES PATENT OFFICE 2,131,528

FLYING MACHINE ADAPTED TO LAND ON WATER

Robert Soyer, Viroflay, France

Application July 28, 1937, Serial No. 156,216
In France May 26, 1937

19 Claims. (Cl. 244—107)

The aerodynamical qualities of a seaplane are always lower than those of an airplane, the chief cause for this being the excessive drag of the landing floats.

The retractable systems for said floats involve the use of connecting rods with numerous joints and of locking devices which must be carefully kept in good state. The fact that these systems are housed in the wing involves serious constructional difficulties, the wing cross section being always insufficient for containing the whole of the float elements to be retracted therein, the apertures being in direct opposition with the possibility of easily maintaining the maximum strength of the wing.

Various systems and devices have been proposed for ensuring safety on water by means of small bags, either for rescue apparatus or for wings, adapted to be inflated with air or an inert gas, or again by means of floats made of balloon cloth. But I am not aware that any of these devices has been applied for practical purposes, and, anyway, none of them is wholly retractable. The object of the present invention is to provide a construction for floats or similar parts which permits of avoiding the drawbacks which have been just mentioned.

Such a float is to be wholly retractable and when fitted on a seaplane it occupies but little room when it is in the retracted position, so that it can be housed in a relatively thin wing.

Furthermore, such a float is to be removable and as its volume is relatively small it can easily be placed in a flat box which will be stored in the hull.

This float is constituted by a bag intended to be inflated with air or another fluid, provided with one or several valves and arranged inside an envelope or cover of flexible, untearable, and unextensible cloth or canvas of suitable shape, in such manner that, once inflated, this bag forms a kind of streamlined hernia capable of facilitating contact of the plane with water when landing. This float is housed in a case or box of relatively small size which can readily be disposed in the wing and which includes an extensible device adapted to bring back the float into retracted position.

According to an embodiment of the invention, which relates more especially to the case in which the wings of the seaplane are located at a relatively high distance above the water level, the box or casing which contains the float and its control elements (valves) is mounted in a carrying extension system or telescopic support, which can be lowered and kept in the lowered position by means of air or another fluid compressed in a bag or equivalent element containing compressed air or another fluid under the control of suitable valves, in the manner above explained. This telescopic support is adapted to be retracted by pneumatic or hydro-pneumatic means.

The invention also includes an embodiment in which the device for supporting the float or the like, in the landing or extended position includes two telescopic supports analogous to that above mentioned, but which are each provided with an internal chamber, also formed by telescopic elements, which can be filled with water under pressure, so as to produce the extension of the support and to ensure rigidity thereof as a consequence of the water pressure acting upon the face of the float case.

The outward displacement of the float case from the compartment in which it is normally stored up is limited by the action of stays which are interposed between said case and the bottom of the housing or compartment thereof, these stays ensuring the rigidity of the supports both in the longitudinal direction of the float and in the transverse direction thereof.

According to another embodiment of the present invention, the float element, instead of being disposed under the wings, can be mounted on the hull inside which it can be retracted.

Such a float element may be provided on either side of the hull and, in this case, it acts as a kind of fin, when it is in the expanded position at the time of landing.

The outward expansion of floats of this kind, disposed laterally and acting as fins, can be obtained, according to the invention, under the effect of the pressure of a fluid admitted into a bag provided on the inside of the float element.

According to still another embodiment of the present invention, the device for controlling the outward expansion of the floats or fins above referred to includes a pneumatic or hydraulic jack adapted to act upon two pivoting arms which constitute the front and rear edges of the float element and which, in addition to their action for unfolding the float element, also serve to reinforce this element, especially for the front edge or ridge of the float, which is to be subjected to violent efforts when landing on water.

The long bearing surface of the hinges and the structure of the arms ensure the regidity of the fins and prevent any flection in the vertical direction.

Other features of the present invention will result from the following detailed description of some specific embodiments thereof.

Preferred embodiments of the present invention will be hereinafter described, with reference to the accompanying drawings, given merely by way of example, and in which:

Fig. 6 shows, in section, the float mounted on a telescopic support (in the retracted position);

Fig. 7 is a sectional view, analogous to Fig. 6, showing the float in the position of utilization;

Fig. 9 is a diagrammatical view indicating the relative proportions of the various elements;

Fig. 10 is a general view showing a float mounting on two telescopic supports, in extended position, one of these telescopic supports being shown in sectional view;

Fig. 11 is a sectional view on the line XI—XI of Fig. 10;

Fig. 12 is a sectional view on the line XII—XII of Fig. 10;

Fig. 13 is a front view of a float fitted with lateral projections or fins, this elevational view being partly in section on the line XIII—XIII of Fig. 14 and showing one of the fins in the extended position and the other in the retracted position;

Fig. 14 is a sectional view on the line XIV—XIV of Fig. 13;

Fig. 15 is a transverse section of a fin on the line XV—XV of Fig. 14;

Fig. 16 is a diagrammatic elevational view, with portions cut away, of a seaplane hull provided with retractable steps according to the present invention, these steps being shown, in this figure, in the retracted position;

Fig. 17 is a view, analogous to Fig. 16, showing the steps in the extended position, that is to say the utilization position.

Figure 1:
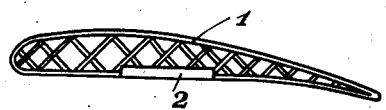
Fig. 1 is diagrammatic sectional view of a low wing of a seaplane, fitted with the float according to the present invention, this float being shown in the retracted position.

As diagrammatically shown on a relatively small scale in Fig. 1, the wing 1, fitted with a float in the retracted position, is of a clean structure, although the presence of compartment 2 for the retracted float slightly reduces the section of the wing.

Figure 2:
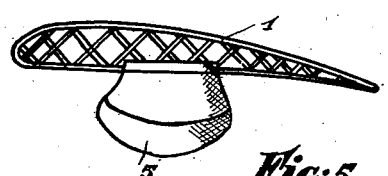
Fig. 2 is a view analogous to Fig. 1, showing the float in the utilization position.
Figure 3:
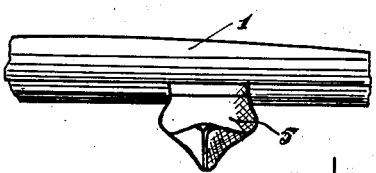
Fig. 3 is a front view of the float corresponding to Fig. 2.

Figs. 2 and 3 show the profile of the wing in question in the case in which the float is extended and they give an example of the fairing obtained at 5, owing to the provision of envelope 3, of suitable shape, made of unetearable and unextensible cloth or canvas.

Figure 5:
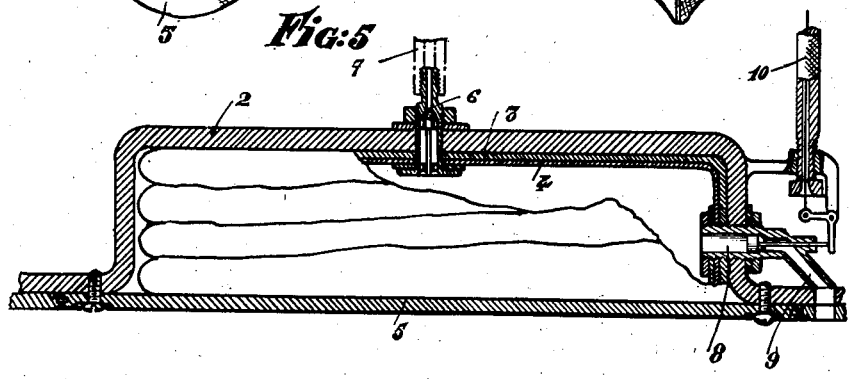
Fig. 5 is a detail view on an enlarged scale and in section of the float.
Figure 8:
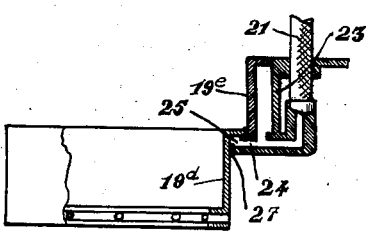
Fig. 8 is a detail view of the device for retracting the float.

As indicated by Fig. 5, which shows the section of a compartment or case 2 of a simplified kind, the float, constituted by a bag 4 adapted to be inflated with air or any other fluid and surrounded by the canvas envelope 3, is housed, when it is retracted, wholly inside compartment 2. The latter is closed by a rubber diaphragm 5 of rubber of a thickness and quality corresponding to the required work. In particular, this rubber must be very strong and highly extensible. This diaphragm is intended to resist the intensive friction of water at the time of landing and to bring back the elements which control extension of the float into retracted position in compartment 2. The air bag 2 is intended to fill the whole of the canvas envelope 3, which surrounds it, when air or another fluid is admitted into it at the pressure that is necessary and sufficient for obtaining a correct fairing of this float. For this purpose, the air bag includes a valve 6 connected through a conduit 7 with the compressing elements (not visible on the drawings) which can be controlled by the pilot. On the other hand, a discharge valve 8 is connected to a conduit 9 which opens into the under surface of the wing, this last mentioned valve being adapted to be operated by the pilot by means of control cable 10.

The float which has just been described operates in the following manner:

In flight, and before landing, the pilot sends compressed air, at a pressure of, say, 3 kgs. per sq. cm., into conduit 7. This air lifts valve 6 from its seat and fills the air bag 4 which, when inflating, causes envelope 3 to expand and has a tendency to form a kind of hernia which is suitably streamlined owing to the provision of envelope 3. At the same time, diaphragm 5 is deformed in a corresponding manner owing to its elasticity and landing can take place in a perfectly safe manner.

For taking off, as soon as the seaplane has been sufficiently lifted from the water, the pilot opens the discharge valve 8. The internal pressure being reduced, diaphragm 1 tends to return to its initial shape, thus immediately bringing back the expanding system into chamber 2 and obtaining in this manner a complete retraction of the float. However, it is advisable to leave inside the air bag a pressure of some grams per sq. cm. so that the variable stresses which, in the course of flight, are exerted upon the wing, do not modify the profile thereof, nor, consequently, the aerodynamical properties thereof.

A float such as just above described is well adapted for use in the case of a wing located close to the water level. If this is not the case, it is necessary to make use of a float of the kind of that illustrated by Figs. 6 to 9. It will be noted that in Figs. 6 and 7, the float lifting device has been considerably enlarged in order to permit of fully understanding its operation, but, as a matter of fact, the space it occupies is substantially smaller and its appearance is somewhat similar to that of a folding telescope. Besides, Fig. 9 permits of understanding the exact proportions.

The float made as above explained is housed inside a box or case 11 which constitutes the inner element of a series of tubes or cylinders 12a, 12b etc., engaging into one another in a telescopic manner, said tubes being provided with flanges 13 and abutments 14. The whole of these tubes is disposed inside compartment 15. At its lower part, case 11 is provided with a flange 16 provided with locking parts 17 which engage for instance between stops 18 cooperating with springs mounted in chamber 15. Between the upper end of this chamber 15 and the upper end of chamber 11, there is provided an annular chamber 26, intended to contain air or any other fluid, and in the central part of which there is provided a pneumatic or hydro-pneumatic lifting system consisting of a series of telescopic tubes 19a, 19b, 19c, etc.

Fluidtightness between these respective elements is obtained through known means, such as packing elements 27 made of leather or any other suitable plastic matter.

A valve 20 permits of sending air or any other fluid under pressure into chamber 26, whereas a conduit 21 permits of sending compressed fluid into the lifting device.

The operation of this last described device is the following:

Prior to landing, the compressed fluid is admitted into the air bag 4 of the float as above described, in order to cause the streamlined float to project from the under surface of the wing. The pilot then sends a small amount of compressed fluid through valve 20 into the chamber 26 located between the end wall of compartment 15 and the top wall of compartment 11.

Under the influence both of the weight of the whole and of the slight pressure exerted upon the upper part of this case 11 by chamber 26, the latter (that is to say case 11) starts moving downwardly against the action of the locking means 17—18. Flange 11a comes into contact with the abutment 14 of the first element 12a, which starts being developed, driving along the other elements together with it. When the telescopic support is in position, the flanges 13 of the sheet metal walls are in contact with the stops or abutments 14 and the various elements 12a, . . . are interlocked with one another, occupying the position shown by Fig. 7.

Figure 4A:
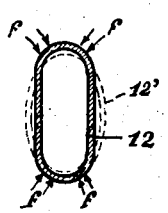
Fig. 4a is a diagrammatic sectional view on the line 4a—4a of Fig. 4.
Figure 4:
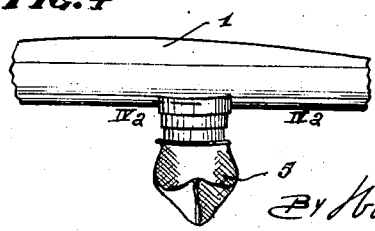
Fig. 4 shows, in a position analogous to that of Fig. 3, the float in the extended position, fitted on a seaplane wing located at a substantial height above the water level.

At this time, the pilot brings the pressure on the inside of the compartment, therefore in chamber 26, to a predetermined maximum which is sufficient for wedging the sheet iron elements that have been developed on one another. The elements, such as 12a, . . . ., being of general oval shape, as shown by Fig. 4a, are deformed as shown by the dotted line 12', and thus exert along the directions of arrows f considerable efforts which ensure the strong wedging of the elements in the direction of the efforts due to landing that the float is to withstand. Consequently, the carrying extension or telescopic support above described is duly secured in position.

It will be noted that the telescopic elements 19a, . . . ., are developed same as elements 12a, . . . , and are brought into the position which is indicated by Fig. 7.

When the pilot desires to lift back the float, he operates in the following manner:

First he retracts the telescopic support. For this purpose, he first causes the pressure to drop in chamber 26 in such manner that, as a consequence of their elasticity, elements 12a come back to their initial shape, thus eliminating the wedging action above referred to.

Then, the streamlined projecting part remaining visible, the pilot sends compressed fluid through conduit 21 into the annular space 22 existing between element 19e and the stationary annular element 23. The pressure acting upon the under face of the flange of element 19e causes it to move upwardly as far as the top of the annular part or first stationary element 23, driving along with it the other elements, which are all interconnected. Once element 19e has been moved upwardly to the end of its stroke, it brings one of the orifices 24 opposite the end of conduit 21 and the pressure can then act in the annular space 25 (Figs. 7 and 8) so as to produce an upward displacement of the next element 19d, and so on until the last element 19a has been moved upwardly. This last mentioned element, which is fixed to the upper wall of casing 11, by means of a plate either riveted or swivelled, or by means of a hook, or in any other suitable manner, is not provided with holes in its lower part. This permits of. strongly holding the whole in the retracted position, the locking means 17—18 having been brought back into action. The whole can then be strongly maintained owing to the pressure which continues to be exerted upon all the lower parts of elements 19 forced back into cylinder 23.

Finally, the pilot then acts upon the controls as indicated in the first case, in such manner as to cause the streamlined "hernia" which acts as a float to be retracted into its case. However, preferably, the pilot will maintain a pressure of some grams in chamber 4 in such manner as to avoid deformations of membrane 5 in flight for the reasons which have been above set forth.

In Fig. 10, I have shown an embodiment of the extension system which includes two supports. This figure shows the compartment 15 in which are stored up, in the retracted position, supports 30 and 31 and casing 11 which contains, in the retracted position, the pneumatic float member the development of which on the outside of the casing, or the retraction of which inside said casing, are obtained through the action of the compressed air or fluid under pressure the conduits for which lead to valves 6 and 8 diagrammatically shown, as described in the above example, with reference to Fig. 5.

Each of these telescopic supports is made as follows:

An external envelope made as above described is constituted by a series of tubes or cylinders 12a, 12b, 12c, 12d, 12e. The first element, to wit 12a, is fixed to casing 11, and the last element, to wit 12e, is rigid with the end wall of compartment 15. This element 12e is connected to the conduit 21 through which the fluid under pressure intended to produce the lifting movement of supports 30 and 31 is fed to the device.

On the inside of the external envelope, there is provided a column constituted by elements 32a, 32b, 32c, 32d, which are telescopically mounted with respect to one another. Packing elements 33 ensure fluidtightness of this column, which opens at its upper part into a valve box 34 connected to the water tank through conduit 35 for the inlet of water and conduit 36 for the discharge of water. The lower wall of this column is constituted by casing 11 on which the element 12a is fixed.

Stays 37 and 38, suitably secured to rings 39, serve to connect casing 11 with the end wall of compartment 15.

In position of flight, the telescopic supports 30 and 31 are folded or retracted and flange 16, owing to the provision of its locking means, is secured to wall 40.

The operation of the device, for bringing it from the retracted position, to the active position, takes place in the following manner:

First, the fluid under pressure which has served to retract the supports (fluid admitted through 21) is evacuated. This evacuation of the fluid takes place through the discharge conduit 41.

Then water under pressure is admitted through conduit 35. The extension column constituted by elements 32a, 32b, etc. is then developed to the length permitted by the size of the stays 37 and 38, as shown by Fig. 12.

At the same time, the external envelope 12a, 12b, 12c, etc. is developed as a consequence of its being acted upon by the flanges and abutments, as above described.

The rigidity of the whole is ensured by the pressure of the water contained in 42, which pressure is exerted upon casing 11, which on the other hand is held by stays 37, 38. This hydraulic or hydro-pneumatic pressure, which is very important if necessary, ensures a perfect rigidity of the whole.

In order to effect the retraction of the system, I first place the discharge conduits 36 into communication with the inside 42 of the column. Water is evacuated toward the tank by the lifting action which is obtained, as above explained. In the course of the lifting action, stays 37 and 38 are freely housed in the empty space as shown by Fig. 11 by way of example.

Rubber fixation means or rings may eventually be provided for facilitating the suitable arrangement of the stays in compartment 15.

It should be well understood that, according to the present invention, the float elements may be located at any suitable place other than under the wing, for instance in the hull or on the sides thereof. The float elements, instead of being developed in a vertical plane can then be extended in a substantially horizontal plane, in such manner as to act as fins for the hull. Such an arrangement is shown, by way of example, in Figs. 13 to 15.

In this case, the development of the bag or hernia which constitutes the float may be ensured not merely by the action of a fluid under pressure but also through a pneumatic or hydro-pneumatic control system cooperating with a mechanical development device, for instance of a kind including a lever. Thus, as shown by the drawings, each float may be provided with two arms 50 and 51, respectively pivoted at 52 and 53 in a compartment 54 intended to contain the fin in retracted position.

The operation of these arms may be obtained in any suitable manner, for instance by means of a hydraulic jack 55 in the cylinder of which are movably mounted two opposed pistons 56 and 57 connected at 58 to arms 50 and 51, respectively.

Between arms 50 and 51, there is provided a bag 60, made of rubber reinforced with cloth and partly fixed to the above mentioned arms 50 and 51. An air bag 61 is mounted on the inside of this envelope 60.

Each of the compartments 54 is closed, when the float is in the retracted position, by a band 62 acting as a diaphragm.

In order to develop each of the floats 64, retracted in compartments 54, as shown on the left hand side of Fig. 13 and Fig. 14, I proceed in the following manner: Water under pressure is fed to jacks 55 through orifices 65 and 66. Orifice 65 is the first to be brought into communication with the water inlet. Consequently, piston 56 is moved in the direction of the arrow f of Fig. 14, arm 50 pivots about its axis 53 and it comes into the position shown by the right hand side of Fig. 14.

As soon as the pivoting movement of arm 50 has been sufficiently started, arm 51 is in turn operated as a consequence of the admission of water at 66.

Arm 51 also comes into the developed position shown by Fig. 14 (on the right hand side thereof). These arms can be maintained in this position by a locking device, not shown in the drawings, the stop finger of which comes to engage, at the end of the developing movement of the arms, into notches 67.

In the course of their pivoting displacement, arms 50 and 51 have produced the extension of diaphragm 62 which conforms to the shape of the outline of the arms and connects them as shown at 68. In a likewise manner, as a consequence of the movements of arms 50 and 51 in opposite directions, the envelope 60 has been unfolded.

A fluid under pressure (air) is then admitted into air bag 61. This pressure, by expanding bag 60, produces a limited inflating of this element, as a consequence of the provision of unextensible cloth or canvas along said bag.

Also, bag 60 will be suitably devised for permitting the creation on the under face of the float element of a balloon-like projection as shown at 69 (Figs. 13 and 15). This is made possible by a proper distribution of the canvas coating of said bag so that it is more extensible on the lower side than on the upper side.

Retraction of the fin thus created takes place in the following manner:

First, the locking members are removed from notches 67 and air is evacuated from chamber 61; then arms 50 and 51 are brought back into their folded positions. In order to obtain this result, it suffices to reverse the direction of the pressure in each of the hydraulic jacks 55.

Water under pressure is admitted through pipe 70 and conduits 65 and 66 are brought into communication with the discharge pipes. In order to ensure a correct operation of the arms, first conduit 66 alone is brought into communication with the discharge pipes, in such manner that arm 51 has started its pivoting movement before arm 50 is actuated.

Arms 50 and 51, by folding down in chamber 54, communicate their movement to bag 60, which is partly fixed to said arms. Complementary elements, such as elastic stays may be provided for facilitating the folding of bag 60, which comes into the space existing between these two arms 50 and 51, and the air bag 61, together with its envelope 60, is retracted into compartment 54.

Finally, diaphragms 62 come to close the whole of the apertures of each of the compartments 54 above referred to.

In the embodiment above described, the movement of arms 50 and 51 was produced by the action of a hydraulic jack, taken by way of example, but other positive means for operating said arms must be considered as the equivalents of said jack, for instance electrical, pneumatic, or other means.

Another embodiment of the invention as applied to stepped hulls for seaplanes is diagrammatically shown in Figs. 16 and 17, showing how the steps can be made retractable.

These steps are made like the floats described with reference to the preceding figures, from which they differ merely by the external shape.

These steps include a casing 73, or 74, respectively, fixed in a housing 75 provided on the inside of the hull 76, and fixed therein in any suitable manner, for instance by means of bolts. These casings are each provided with an aperture at their lower part, this aperture being adapted to be closed by flexible membranes or light metallic plates 71 and 72, pivoted to the hull at 83 and 84, respectively, as shown by the above mentioned Figures 16 and 17.

A bag of canvas-coated rubber 77, 78, adapted to be inflated by a fluid under pressure, is provided with means permitting to inflate it, such for instance as nozzles 79—80 and 81—82.

This arrangement permits of expanding the steps, as shown by Fig. 17, and retracting them, as shown by Fig. 16, in the manner above described with reference to floats.

Of course, the specific embodiments above described must be considered merely as examples illustrating practical possibilities of the invention but having no limitative character.

It will be readily understood that the device for controlling the opening of a fin as above described might also be employed in the case in which the float element is developed in a vertical plane.

Also, it must be clear that, since the above described embodiments are intended to improve simultaneously the aerodynamical properties and the nautical properties of the structure, the improvements in question can be applied to any part of a seaplane, that is to say not only landing floats and steps as above described, but also wing tip floats, and the like.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In combination, in a flying machine adapted to land on water, and especially a seaplane provided with a housing, a part adapted to come into contact with said water consisting of a flexible structure, adapted to be inflated so as to project from said housing means for rigidly connecting said flexible structure to the inside of said housing, said structure and said means being wholly retractable inside said housing, and closure means for said housing deformable by inflation of said structure and bringing back said structure inside said housing.

2. In combination, in a flying machine adapted to land on water, and especially a seaplane, provided with a housing, a case provided with an aperture in a wall thereof, means for connecting said case to the bottom of said housing, a deformable bag inside said case adapted to project, when inflated, from said case through said aperture with a predetermined streamlined shape, means for inflating said bag, closure means, on said aperture, for protecting said bag, and bringing back said bag to its initial place inside said case.

3. In combination, in a flying machine adapted to land on water, and especially a seaplane, provided with a housing, a case provided with an aperture in a wall thereof, means for connecting said case to the bottom of said housing, an unextensible cloth envelope mounted inside said case adapted to project, when inflated, from said case through said aperture with a streamlined shape, an inflatable elastic air bag inside said first mentioned bag, means for admitting a fluid under pressure to said air bag, and means for bringing back said envelope and said bag to their initial place inside said case.

4. In a flying machine adapted to land on water, and especially a seaplane, a retractable flexible float structure which comprises, in combination, a case provided with an aperture in a wall thereof, means for connecting said case to said machine, an unextensible cloth envelope mounted inside said case adapted to project, when inflated, from said case through said aperture with a streamlined shape, an inflatable elastic air bag inside said envelope, an inlet valve for the inflow of air under pressure to said air bag, an outlet valve for the outflow of air from said inflatable bag, means for controlling said valves, and means for bringing back said envelope and said bag to their initial place inside said case.

5. In a flying machine adapted to land on water, and especially a seaplane, a retractable flexible float structure which comprises, in combination, a case provided with an aperture in a wall thereof, means for connecting said case with a part of said machine, a deformable bag inside said case adapted to project, when inflated, from said case through said aperture with a predetermined streamlined shape, means for inflating said bag, and an elastic diaphragm on said aperture adapted to protect said bag and to bring it back to its initial place inside said case.

6. In a flying machine adapted to land on water, and especially a seaplane, a retractable flexible float structure which comprises, in combination, a case provided with an aperture in the lower wall thereof, means for connecting said case with a part of said machine, an unextensible cloth envelope mounted inside said case adapted to project, when inflated, from said case through said aperture with a streamlined shape, an inflatable elastic air bag inside said envelope, means for admitting a fluid under pressure into said air bag, and an elastic diaphragm on said aperture adapted to protect said envelope and to bring it, together with its air bag, back to their initial place inside said case.

7. In a flying machine adapted to land on water, and especially a seaplane, a retractable flexible float structure which comprises, in combination, a case provided with an aperture in the lower wall thereof, means for connecting said case with a part of said machine, an unextensible cloth envelope mounted inside said case adapted to project, when inflated, from said case through said aperture with a streamlined shape, an inflatable elastic air bag inside said envelope, an inlet valve for the inflow of air under pressure to said air bag, an outlet valve for the outflow of air from said inflatable bag, means for controlling said valves, and an elastic diaphragm on said aperture adapted to protect said envelope and to bring it, together with its air bag, back to their initial place inside said case.

8. In a flying machine adapted to land on water, and especially a seaplane, provided with a housing, a retractable flexible float structure which comprises, in combination, a case provided with an aperture in a wall thereof, means for connecting said case to the bottom of said housing, a deformable bag inside said case adapted to project, when inflated, from said case through said aperture with a predetermined streamlined shape, arms pivotally mounted to said casing close to said aperture inside said bag so as to deform it through said aperture, an inflatable air bag inside said first mentioned bag, means for admitting fluid under pressure into said air bag, means for protecting said aperture and said bags, and bringing back said bags to their initial positions inside said case.

9. In a flying machine adapted to land on water, and especially a seaplane, provided with a housing, a retractable flexible float structure which comprises, in combination, a case provided with an aperture in a wall thereof, means for connecting said case to the bottom of said housing, an unextensible cloth envelope mounted inside said case adapted to project, when inflated, from said case through said aperture with a streamlined shape, arms pivoted to said case about axes located on the inside thereof, said arms being adapted to deform said envelope through said aperture, fluid controlled jacks for operating said arms, means for controlling the feed of fluid under pressure to said jacks, means for locking said arms in their respective open positions, an inflatable elastic air bag inside said envelope, means for admitting a fluid under pressure into said air bag, means for protecting said aperture and said bags, and bringing back said bags to their initial positions inside said case.

10. In a flying machine adapted to land on water, and especially a seaplane, provided with a housing, a retractable flexible float structure which comprises, in combination, an unextensible cloth envelope mounted inside said housing adapted to project therefrom, when inflated, with a streamlined shape, arms pivoted in said housing about vertical axes located on the inside thereof, said arms being adapted to stretch said envelope on the outside of said housing, means for locking said arms in their respective open positions, an inflatable elastic air bag inside said envelope, means for admitting a fluid under pressure into said bag, and an elastic diaphragm fixed on the outside of said housing for closing it.

11. In combination, in a flying machine adapted to land on water, and especially a seaplane, having a housing formed in the under part of a wing thereof, a rigid casing, means for connecting said casing with the bottom of said housing, said casing being provided with an aperture in the lower wall thereof, an unextensible canvas envelope inside said casing adapted to project, when inflated, from said casing through said aperture with a streamlined shape, an inflatable air bag inside said envelope, an inlet valve for controlling the inflow of a fluid under pressure into said chamber, said valve being of the automatic type, an outlet valve for controlling the outflow of fluid from said bag, and a rubber diaphragm fixed on said aperture adapted to bring back said envelope, together with its bag, into said casing.

12. In combination, in a flying machine adapted to land on water, and especially a seaplane, provided with a housing, a retractable flexible float adapted to assume, when inflated a streamlined shape, a case containing said float, an extensible supporting structure rigidly connected to said case including a plurality of telescopic tubular elements, means for fixing the last of these elements inside said housing, means for developing said elements, means for retracting the elements thus developed, and locking means for keeping said series of elements in the expanded or retracted position inside said case.

13. In combination, in a flying machine, adapted to land on water, and esepecially a seaplane, provided with a housing, a retractable flexible float adapted to assume, when inflated, a streamlined shape, a case containing said float, an extensible supporting structure rigidly connected to said case, including a set of telescopic elements, means for fixing the last of these elements in said housing, another set of telescopic elements, the last element of said second set of telescopic elements being fixed to the bottom of said housing and the first element thereof being fixed to said case, means for admitting a fluid under pressure between two elements of the second set of telescopic elements and then between the second of these two elements and the next one, and so on, in such manner as to lift said casing, and means for locking said first mentioned set of telescopic elements on said case.

14. In combination, in a flying machine adapted to land on water, and especially a seaplane, provided with a housing, a retractable flexible float adapted to assume, when inflated, a streamlined shape, a case containing said float, an extensible supporting structure including a plurality of elements engaging telescopically in one another and of oval section, the first of these elements being rigid with said casing and the last being fixed in said housing, a second extensible structure, including another set of tubular elements engaging telescopically in one another and an inflatable bag interposed between said first mentioned extensible structure and said second extensible structure, for developing said supporting structure and effecting the wedging of said elements especially near the longer axes of the section, where the stresses due to landing are most important.

15. In combination, in a flying machine adapted to land on water, and especially a seaplane provided with a housing, a retractable flexible float adapted to assume, when inflated, a streamlined shape, a case containing said float, an extensible supporting structure interconnecting said case with the bottom of said housing, inflatable means for extending said extensible supporting structure, another extensible structure adapted to retract said supporting structure, the second mentioned extensible structure including a plurality of tubular elements engaging telescopically in one another and arranged to act as pistons in one another, fluidtight packing means on each of said tubular elements, orifices at the lower part of all of these tubular elements respectively, with the exception of the one which is rigid with said case, adapted to permit a fluid under pressure successively to lift said elements, and inlet means for admitting a fluid under pressure between the above mentioned element fixed to the flying machine and the next element.

16. In combination, in a flying machine adapted to land on water, and especially a seaplane provided with a housing, a retractable flexible float adapted to assume, when inflated, a streamlined shape, a plurality of extensible supporting structures, means for fixing said structures at one end to the bottom of said housing, means for fixing said structures at the other end to said float, means for simultaneously extending said respective extensible structures, means for limiting this extension of said structures, and means for retracting said extensible supporting structures.

17. In combination, in a flying machine adapted to land on water, and especially a seaplane provided with a housing, a retractable flexible float adapted to assume, when inflated, a streamlined shape, a case adapted to contain said float, two extensible supporting structures inserted between said case and the bottom of said housing, a plurality of telescopic elements, in each of said supporting structures, engaging in one another so as to form between them spaces of variable volume adapted to receive water under pressure, inlet means for admitting water into pressure into said spaces so as to extend said structures, another set of telescopic elements mounted in each of these extensible structures for retracting them, respectively, fluid pressure means for operating said last mentioned telescopic elements so as to effect said retraction, and stays fixed at one end to the bottom of said housing and at the other end to said case for limiting the extension of said supporting extensible structures.

18. In a flying machine adapted to land on water, and especially a seaplane, having a hull provided with at least one housing, a retractable flexible step which comprises, in combination, a case, means for securing said case inside said housing, said case being provided with an aperture in the under wall thereof, an inflatable air bag inside said case, means for feeding a fluid under pressure to said bag, and a rubber diaphragm mounted on said aperture for protecting said bag and urging it back toward the inside of said chamber.

19. In a flying machine adapted to land on water, and especially a seaplane, provided with a housing, a retractable flexible float structure which comprises, in combination, an inextensible cloth envelope mounted inside said housing adapted to project therefrom when inflated with a streamlined shape, arms pivoted in said housings about vertical axes located on the inside thereof, said arms being adapted to stretch said envelope on the outside of said casing, said envelope projecting beyond the ends of said arms when fully developed, means for operating said arms, means for locking said arms in their respective open positions, an inflatable air bag inside said envelope, means for admitting a fluid under pressure into said bag, and an elastic diaphragm fixed on the outside of said aperture so as to form a closure without projection when said envelope is folded inside said housing.

ROBERT SOYER.